United States Patent
Heibel et al.

(10) Patent No.: US 10,438,708 B2
(45) Date of Patent: Oct. 8, 2019

(54) IN-CORE INSTRUMENT THIMBLE ASSEMBLY

(71) Applicant: WESTINGHOUSE ELECTRIC COMPANY LLC, Cranberry Township, PA (US)

(72) Inventors: Michael D. Heibel, Harrison City, PA (US); Daniel P. Kistler, Plum, PA (US); Jorge V. Carvajal, Irwin, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 1994 days.

(21) Appl. No.: 13/644,133

(22) Filed: Oct. 3, 2012

(65) Prior Publication Data

US 2013/0083879 A1    Apr. 4, 2013

Related U.S. Application Data

(60) Provisional application No. 61/542,941, filed on Oct. 4, 2011.

(51) Int. Cl.
| | |
|---|---|
| *G21C 17/10* | (2006.01) |
| *G21C 17/108* | (2006.01) |
| *G21H 1/00* | (2006.01) |
| *G21H 1/02* | (2006.01) |
| *G21H 1/04* | (2006.01) |

(52) U.S. Cl.
CPC ........... *G21C 17/10* (2013.01); *G21C 17/102* (2013.01); *G21C 17/108* (2013.01); *G21H 1/00* (2013.01); *G21H 1/02* (2013.01); *G21H 1/04* (2013.01)

(58) Field of Classification Search
CPC ....... G21H 1/00; G21C 17/104; G21C 17/108
USPC .................................................. 376/317, 321
See application file for complete search history.

(56) References Cited

U.S. PATENT DOCUMENTS

| | | | |
|---|---|---|---|
| 3,872,311 A * | 3/1975 | Goldstein et al. | 250/370.04 |
| 3,879,612 A | 4/1975 | Foster et al. | |
| 4,197,463 A | 4/1980 | Todt et al. | |
| 4,237,380 A | 12/1980 | Playfoot et al. | |
| 4,579,781 A | 4/1986 | Akao | |
| 5,078,957 A | 1/1992 | Tower et al. | |
| 5,251,242 A | 10/1993 | Impink, Jr. et al. | |

(Continued)

FOREIGN PATENT DOCUMENTS

JP    2007212439 A    8/2007

OTHER PUBLICATIONS

U.S. Appl. No. 12/986,242, entitled "Wireless In-core Neutron Monitor," filed Jan. 7, 2011.

(Continued)

*Primary Examiner* — Sharon M Davis
(74) *Attorney, Agent, or Firm* — Joseph C. Spadacene; Westinghouse Electric Company LLC

(57) ABSTRACT

A self-powered integral in-core instrument thimble assembly for monitoring the temperature and radiation levels surrounding a nuclear fuel assembly, that transmits output signals wirelessly to a remote location. The in-core instrument thimble assembly is activated by a short exposure within a reactor core and remains active after the fuel assembly is removed from the reactor core to continuously provide a remote monitoring capability for the fuel assembly as it is transported or stored at a remote location, without an external power source.

12 Claims, 11 Drawing Sheets

(56) References Cited

U.S. PATENT DOCUMENTS

| | | |
|---|---|---|
| 5,745,538 A | 4/1998 | Heibel |
| 2009/0154633 A1* | 6/2009 | Fawks, Jr. .................... 376/254 |
| 2010/0150294 A1 | 6/2010 | Weisel et al. |
| 2012/0177166 A1 | 7/2012 | Seidel et al. |
| 2012/0177167 A1 | 7/2012 | Heibel et al. |

OTHER PUBLICATIONS

International Preliminary Report on Patentability for PCT/US2012/058585 dated Apr. 17, 2014 (Forms PCT/IB/373, PCT/ISA/237).
N. P. Goldstein, "A Survey of Self-Powered Detectors—Present and Future," IEEE Transactions on Nuclear Science, Feb. 1979, vol. NS-26, No. 1.
International Search Report, dated May 23, 2013, 2 pages.
Written Opinion of the International Searching Authority for PCT/US2012/058585 dated Jun. 17, 2013 (Form PCT/ISA/237).
Supplementary European Search Report dated May 13, 2015 for EP12864430.

* cited by examiner

IN-CORE INSTRUMENT THIMBLE ASSEMBLY

CROSS REFERENCE TO RELATED APPLICATION

This application claims priority under 35 U.S.C. § 119(e) from U.S. Provisional Application Ser. No. 61/542,941, entitled POWER SUPPLY ELEMENT FOR IN-CORE ELECTRONICS, filed on Oct. 4, 2011.

BACKGROUND

1. Field

The present invention pertains generally to a nuclear fuel assembly having an in-core instrument thimble assembly that monitors the temperature and radiation environment surrounding the fuel assembly; and more particularly, to such an in-core instrument thimble assembly that is self-powered and can wireless transmit the monitored radiation and temperature information to a remote location.

2. Related Art

In many state-of-the-art nuclear reactor systems in-core sensors are employed for measuring the radioactivity within the core at a number of axial elevations. These sensors are used to measure the radial and axial distribution of the power inside the reactor core. This power distribution measurement information is used to determine whether the reactor is operating within nuclear power distribution limits. The typical in-core sensor used to perform this function is a self-powered detector that produces an electric current that is proportional to the amount of fission occurring around it. This type of sensor does not require an outside source of electrical power to produce the current and is commonly referred to as a self-powered detector and is more fully described in U.S. Pat. No. 5,745,538, issued Apr. 28, 1998, and assigned to the Assignee of this invention. FIG. 1 provides a diagram of the mechanisms that produce the current I(t) in a self-powered detector element 10. A neutron sensitive material such a vanadium is employed for the emitter element 12 and emits electrons in response to neutron irradiation. Typically, the self-powered detectors are grouped within instrumentation thimble assemblies. A representative in-core instrumentation thimble assembly is shown in FIG. 2. The signal level generated by the essentially non-depleting neutron sensitive emitter 12 shown in FIG. 1 is low, however, a single, full core length neutron sensitive emitter element provides an adequate signal without complex and expensive signal processors. The proportions of the full length signal generated by the single neutron sensitive emitter element attributable to various axial regions of the core are determined from apportioning the signal generated by different lengths of gamma sensitive elements 14 which define the axial regions of the core and are shown in FIG. 2. The apportioning signals are ratioed which eliminates much of the effects of the delayed gamma radiation due to fission products. The in-core instrumentation thimble assemblies also include a thermocouple 18 for measuring the temperature of the coolant exiting the fuel assemblies. The electrical signal output from the self-powered detector elements and the thermocouple in each in-core instrumentation thimble assembly in the reactor core are collected at the electrical connector 20 and sent to a location well away from the reactor for final processing and use in producing the measured core power distribution.

FIG. 3 shows an example of a core monitoring system presently offered for sale by Westinghouse Electric Company LLC, Cranberry, Pa., with a product name WINCISE™ that employs fixed in-core instrumentation thimble assemblies 16 within the instrument thimbles of the fuel assemblies within the core to measure the core's power distribution. Cabling 22 extends from the instrument thimble assemblies 16 through the containment seal table 24 to a single processing cabinet 26 where the outputs are conditioned, digitized and multiplexed and transmitted through the containment walls 28 to a computer workstation 30 where they can be further processed and displayed. The thermocouple signals from the in-core instrumentation thimble assemblies are also sent to a reference junction unit 32 which transmits the signals to an inadequate core cooling monitor 34 which communicates with the plant computer 36 which is also connected to the workstation 30. Because of the hostile environment within the containment walls 28, the signal processing cabinet 26 has to be located a significant distance away from the core and the signal has to be sent from the detectors 16 to the signal processing cabinet 26 through specially constructed cables that are extremely expensive and the long runs reduce the signal to noise ratio. Unfortunately, these long runs of cable have proved necessary because the electronics for signal processing has to be shielded from the highly radioactive environment surrounding the core region.

In previous nuclear plant designs, the in-core detectors entered the reactor vessel from the lower hemispherical end and entered the fuel assemblies' instrument thimble from the bottom fuel assembly nozzle. In at least some of the current generation of nuclear plant designs, such as the AP1000 nuclear plant, the in-core monitoring access is located at the top of the reactor vessel, which means that during refueling all in-core monitoring cabling will need to be removed before accessing the fuel. A wireless in-core monitor that is self-contained within the fuel assemblies and wirelessly transmits the monitored signals to a location remote from the reactor vessel would allow immediate access to the fuel without the time-consuming and expensive process of disconnecting, withdrawing and storing the in-core monitoring cables before the fuel assemblies could be accessed, and restoring those connections after the refueling process is complete. A wireless alternative would thus save days in the critical path of a refueling outage. A wireless system also allows every fuel assembly to be monitored, which significantly increases the amount of core power distribution information that is available.

However, a wireless system requires that electronic components be located at or near the reactor core where gamma and neutron radiation and high temperatures would render semi-conductor electronics inoperable within a very short time. Vacuum tubes are known to be radiation insensitive, but their size and electric current demands have made their use impractical until recently. Recent developments in micro-electromechanical devices have allowed vacuum tubes to shrink to integrated circuit component sizes and significantly reduce power draw demands Such a system is described in U.S. patent application Ser. No. 12/986,242 , entitled "Wireless In-core Neutron Monitor," filed Jan. 7, 2011. The primary electrical power source for the signal transmitting electrical hardware for the embodiment disclosed in the afore-noted patent application is a rechargeable battery shown as part of an exemplary power supply. The charge on the battery is maintained by the use of the electrical power produced by a dedicated power supply self-powered detector element that is contained within the power supply, so that the nuclear radiation in the reactor is the ultimate power source for the device and will continue so long as the dedicated power supply self-powered detector element is exposed to an intensity of radiation experienced within the core. It would be an added advantage if the in-core instrumentation thimble assembly could remain active within the fuel assembly even after the fuel assembly was removed from the reactor core so that the condition of the fuel assembly could be continuously monitored in the spent fuel storage pool, storage casks, or in transport to a final storage location, to assure that criticality is avoided and temperatures do not rise to a point that could damage the integrity of the fuel assembly.

Therefore, it is an object of this invention to provide an in-core instrumentation thimble assembly that is capable of being remotely monitored wirelessly after it is removed from the core of a nuclear reactor.

Additionally, it is an object of this invention to provide a power supply for a nuclear reactor in-core electronics assembly that relies upon the neutron transmutation of fission products within the power supply to energize the power supply to generate an electric current sufficient to support the wireless transmission of radiation and temperature monitored signals to a remote location.

Further, it is an object of this invention to provide such a power supply that produces a substantially measurable current only after first being irradiated, primarily by fission gamma interactions within a core of a nuclear reactor.

SUMMARY

These and other objects are achieved by a power supply for a nuclear reactor in-core electronics assembly which does not produce a substantially measurable current capable of powering the in-core electronics assembly until irradiated from an external source of radiation and after being irradiated from the external source or radiation continues to produce power that can power the electronics assembly. The power supply includes a self-powered power supply element comprising a material that produces a substantially measurable current only after being irradiated by an external source of radiation and continues to produce the substantially measurable current when removed from the external source of radiation. The power supply element is hermetically sealed within a power supply housing to isolate the power supply element from a coolant fluid within the core of a nuclear reactor. Desirably, the self-powered power supply element produces the substantially measurable current relying on supplemental radiation produced by neutron transmutation or fission products from material contained within the power supply element following irradiation by the external source after being removed from the external source of radiation. Preferably, the external source of radiation is the radiation experienced in a reactor core. Desirably, the self-powered supply element comprises a material that produces the substantially measurable current only after being irradiated primarily by fission gamma interactions within the core of the nuclear reactor.

In one embodiment, the self-powered power supply element comprises an electrical lead substantially circumferentially surrounded by a cobalt-59 sleeve that is substantially circumferentially enclosed within a platinum sheath, Preferably, the platinum sheath is circumferentially enclosed within a steel outer sheath with electrical insulation interposed there between. Desirably, the insulation is alumina. In another preferred embodiment, the electrical lead in the power supply is coated with cobalt-59, which in turn is coated with platinum.

These and other objects are further achieved by a nuclear fuel assembly having a self-powered in-core instrument thimble assembly activated by the afore-described self-powered power supply element integral within the nuclear fuel assembly. The self-powered in-core instrument thimble assembly further includes separate neutron and gamma sensitive self-powered detector elements co-located within the in-core instrument thimble assembly with a thermocouple sensor positioned within the in-core instrument thimble assembly within a vicinity of a top nozzle of the nuclear fuel assembly. The separate neutron and gamma sensitive elements and the thermocouple are configured to provide self-powered wireless signals that can be wirelessly transmitted to a processing station and from which the core power distribution, nearness to criticality, temperature distribution or $K_{eff}$ of the fuel assembly can be determined. Desirably, the self-powered in-core instrument thimble assembly is configured to provide information from which the total amount and distribution of fission product decay heat within the fuel assembly can be determined in a spent fuel storage receptacle. Additionally, in still another embodiment, the self-powered in-core instrument thimble assembly within the fuel assembly is configured to provide information from which an associated coolant pool temperature distribution can be determined and tracked on a continuous, self-powered, wireless basis when the fuel assembly is placed in a spent fuel pool. Desirably, the thermocouple sensor and the separate neutron and gamma sensitive self-powered detector elements are housed respectively within separate housings with a common electrical ground configured so that the sensor and the elements all remain electrically isolated.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The primary side of nuclear power generating systems which are cooled with water under pressure comprises a closed circuit which is isolated from and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the reactor vessel form a loop of the primary side.

Figure 4:
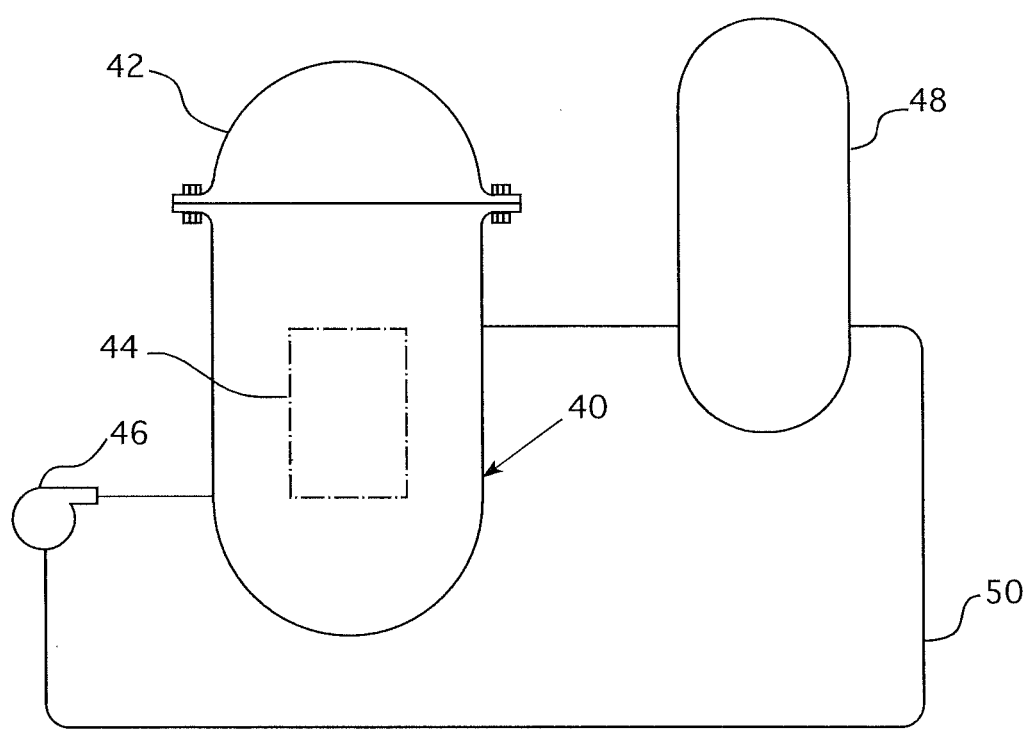
FIG. 4 is a simplified schematic of a nuclear reactor system primary loop to which this invention can be applied.

For the purpose of illustration, FIG. 4 shows a simplified nuclear reactor primary system, including a generally cylindrical pressure vessel 40, having a closure head 42 enclosing a nuclear core 44. A liquid reactor coolant, such as water, is pumped into the vessel 40 by pump 46 through the core 44 where heat energy is absorbed and is discharged to a heat exchanger 48, typically referred to as a steam generator, in which heat is transferred to a utilization circuit (not shown), such as a steam driven turbine generator. The reactor coolant is then returned to the pump 46 completing the primary loop. Typically, a plurality of the above-described loops are connected to a single reactor vessel 40 by reactor coolant piping 50.

Figure 5:
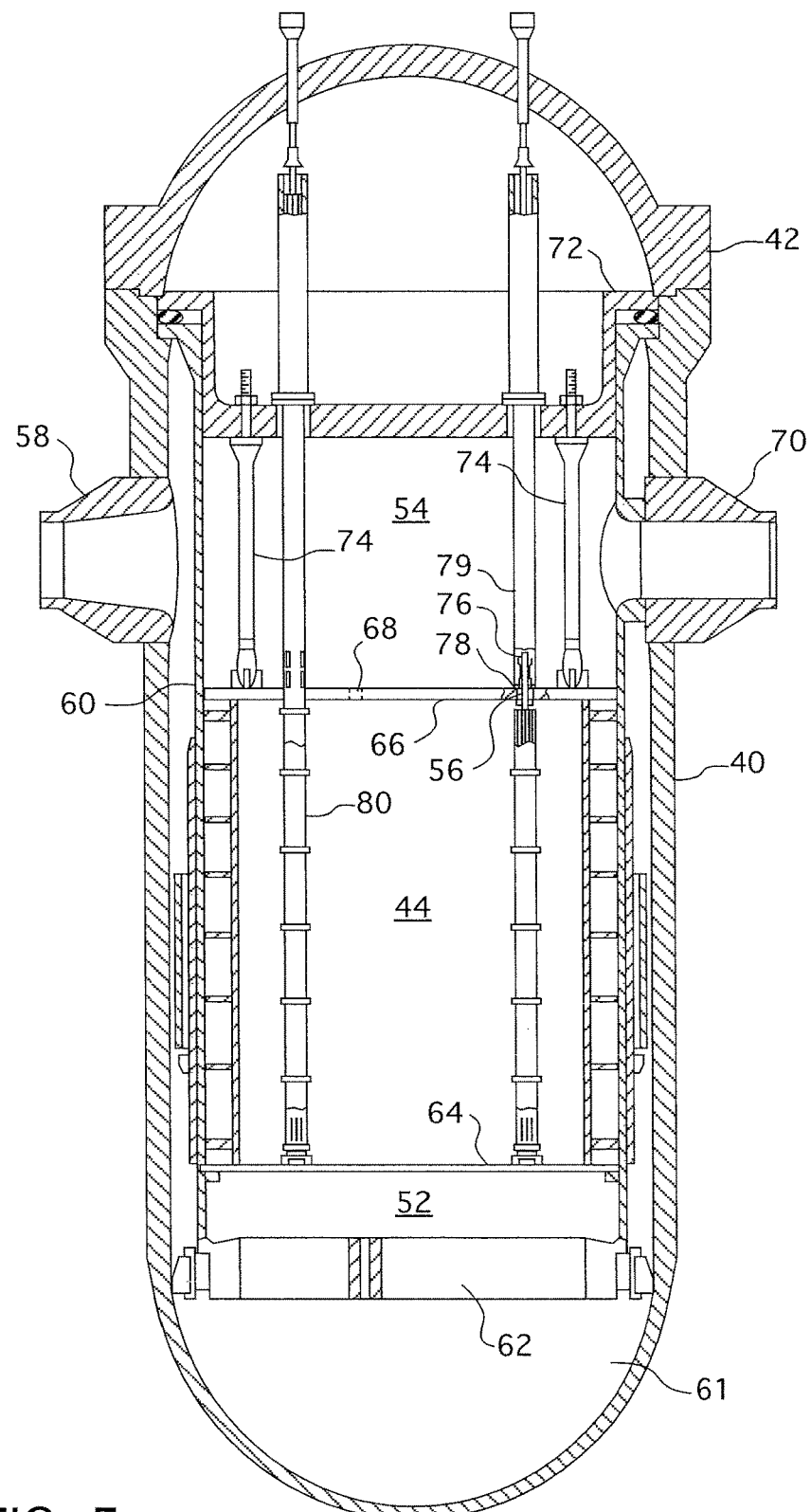
FIG. 5 is an elevational view, partially in section, of a nuclear reactor vessel and interior components to which this invention can be applied.

An exemplary reactor design to which this invention can be applied is illustrated in FIG. 5. In addition to the core 44 comprised of a plurality of parallel, vertical, co-extending fuel assemblies 80, for purpose of this description, the other vessel internal structures can be divided into the lower internals 52 and the upper internals 54. In conventional designs, the lower internals' function is to support, align and guide core components and instrumentation as well direct flow within the vessel. The upper internals 54 restrain or provide a secondary restraint for the fuel assemblies 80 (only two of which are shown for simplicity in this figure), and support and guide instrumentation and components, such as control rods 56. In the exemplary reactor shown in FIG. 5, coolant enters the reactor vessel 40 through one or more inlet nozzles 58, flows down through an annulus between the reactor vessel 40 and the core barrel 60, is turned 180° in a lower reactor vessel plenum 61, passes upwardly through a lower support plate and a lower core plate 64 upon which the fuel assemblies 80 are seated, and through and about the assemblies. In some designs, the lower support plate 62 and the lower core plate 64 are replaced by a single structure, the lower core support plate that has the same elevation as 62. Coolant exiting the core 44 flows along the underside of the upper core plate 66 and upwardly and through a plurality of perforations 68 in the upper core plate 66. The coolant then flows upwardly and radially to one or more outlet nozzles 70.

The upper internals 54 can be supported from the vessel or the vessel head 42 and includes an upper support assembly 72. Loads are transmitted between the upper support assembly 72 and the upper core plate 66 primarily by a plurality of support columns 74. Each support column is aligned above a selected fuel assembly 80 and perforations 68 in the upper core plate 66.

The rectilinearly movable control rods 56 typically include a drive shaft 76 and a spider assembly 78 of neutron poison rods that are guided through the upper internals 54 and into aligned fuel assemblies 80 by control rod guide tubes 79.

Figure 6:
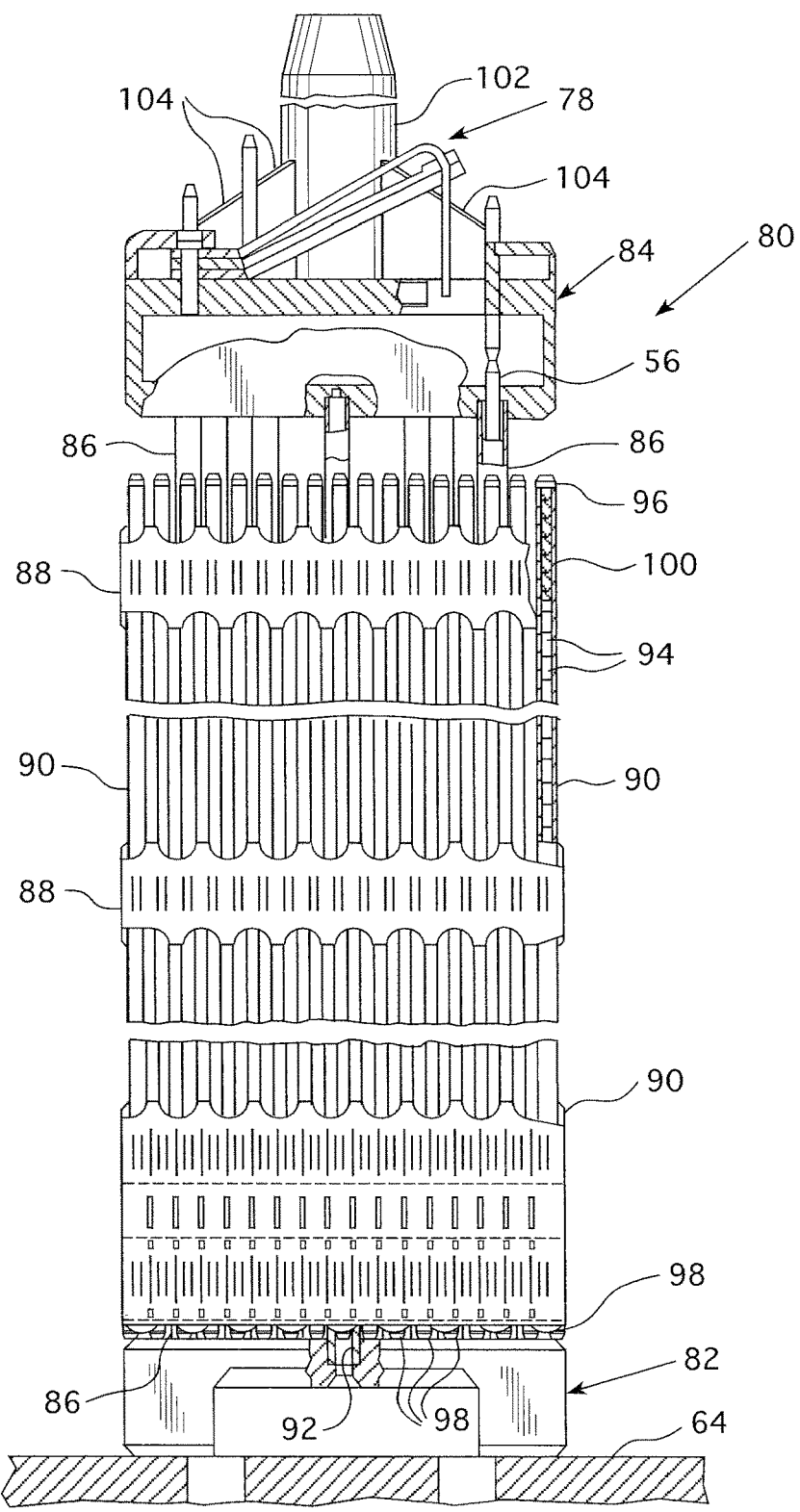
FIG. 6 is an elevational view, partially in section, of a nuclear fuel assembly that contains the in-core nuclear instrument thimble assembly of this invention.

FIG. 6 is an elevational view represented in vertically shortened form, of a fuel assembly being generally designated by reference character 80. The fuel assembly 80 is the type used in a pressurized water reactor and has a structural skeleton which at its lower end includes a bottom nozzle 82. The bottom nozzle 82 supports the fuel assembly on the lower core support plate 64 in the core region of the nuclear reactor. In addition to the bottom nozzle 82, the structural skeleton of the fuel assembly 80 also includes a top nozzle 84 at its upper end and a number of guide tubes or thimbles 86 which extend longitudinally between the bottom and top nozzles 82 and 84 and at opposite ends are rigidly attached thereto.

The fuel assembly 80 further includes a plurality of transverse grids 88 axially spaced along and mounted to the guide thimbles 86 (also referred to as guide tubes) and an organized array of elongated fuel rods 90 transversely spaced and supported by the grids 88. Although it cannot be seen in FIG. 6, the grids 88 are conventionally formed from orthogonal straps that are interleaved in an egg-crate pattern with the adjacent interface of four straps defining approximately square support cells through which the fuel rods 90 are supported in transversely spaced relationship with each other. In many conventional designs, springs and dimples are stamped into the opposing walls of the straps that form the support cells. The springs and dimples extend radially into the support cells and capture the fuel rods therebetween; inserting pressure on the fuel rod cladding to hold the rods in position. Also, the assembly 80 has an instrumentation tube 92 located in the center thereof that extends between and is mounted to the bottom and top nozzles 82 and 84. With such an arrangement of parts, the fuel assembly 80 forms an integral unit capable of being conveniently handled without damaging the assembly of parts.

As mentioned above, the fuel rods 90 in the array thereof in the assembly 80 are held in spaced relationship with one another by the grids 88 spaced along the fuel assembly length. Each fuel rod 90 includes a plurality of nuclear fuel pellets 94 and is closed at its opposite ends by upper and lower end plugs 96 and 98. The fuel pellets 94 are maintained in a stack by a plenum spring 100 disposed between the upper end plug 96 in the top of the pellet stack. The fuel pellets 94, composed of fissile material, are responsible for creating the reactive power of the reactor. The cladding, which surrounds the pellets, functions as a barrier to prevent fission byproducts from entering the coolant and further contaminating the reactor system.

To control the fission process, a number of control rods 56 are reciprocally movable in the guide thimbles 86 located at predetermined positions in the fuel assembly 80. Specifically, a rod cluster control mechanism (also referred to as a spider assembly) 78 positioned above the top nozzle 84 supports the control rods 56. The rod cluster control mechanism has an internally threaded cylindrical hub member 102 with a plurality of radially extending flukes or arms 104 that with the control rods 56 form the spider assembly 78 that was previously mentioned with respect to FIG. 5. Each arm 104 is interconnected to the control rods 56 such that the control mechanism 78 is operable to move the control rods vertically in the guide thimbles to thereby control the fission process in the fuel assembly 80, under the motor power of control rod drive shafts 76 (shown in FIG. 5) which are coupled to the control rod hubs 102, all in a well known manner.

Figure 7:
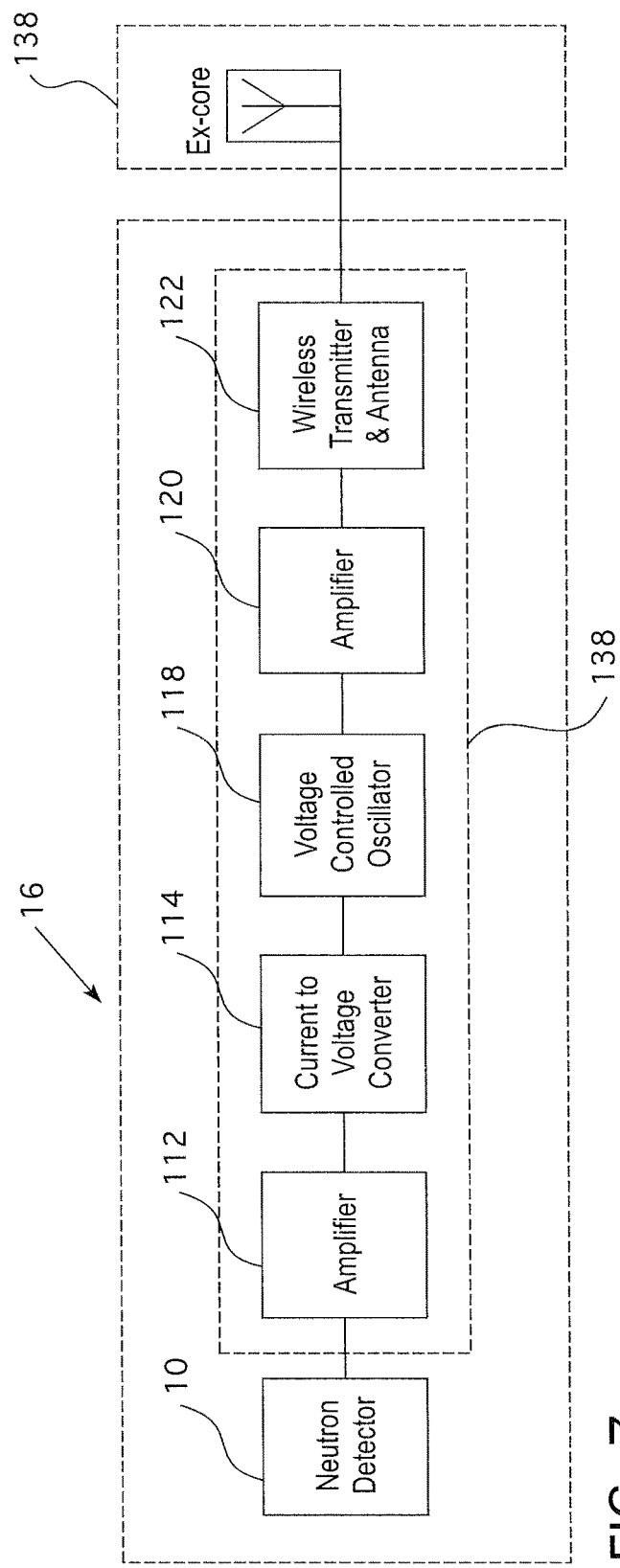
FIG. 7 is a block diagram of the electronics that can be applied with this invention.

As mentioned above, in the AP1000 nuclear plant design, the in-core monitoring access is through the top of the reactor vessel, which is a significant departure from previous designs which fed the fixed in-core detector cables through the bottom of the reactor vessel and into the fuel assembly instrument thimbles through the lower fuel assembly nozzle. The change in design means that during refueling all conventional in-core monitoring cabling will need to be removed before accessing the fuel. This invention provides wireless in-core monitor that is wholly contained within the instrument thimble within the fuel assemblies without any tether that extends outside the core and would permit access to the fuel assemblies without going through the costly and time-consuming steps of removing and reconnecting the cabling. Furthermore, this invention provides a fuel assembly sensor system that can continue to monitor the radiation and temperature levels of the fuel assembly after the fuel assembly has been removed from the core. In accordance with this invention, the in-core instrument thimble assembly is illustrated as a block diagram in FIG. 7 and includes, in addition to the fixed in-core neutron detector, a self-contained power source and a wireless transmission circuit. In one embodiment, within the transmission circuit, the neutron detector output current is fed directly into an amplifier 112, thus eliminating cabling concerns. One or more stages of amplification are provided within the amplifier 112, preferably using vacuum micro-electronic devices. A vacuum diode is preferably placed in the grid circuit of the amplifier to make the amplifier respond algorithmically, thus enabling the electronics to follow the neutron flux from start-up through full power. The amplified signal is then fed to a current voltage converter 114. The output voltage of the current voltage converter 114 is used as the input to a voltage controlled oscillator 118 which converts the voltage into a frequency output. As the neutron flux changes, so will the voltage input to the voltage controlled oscillator, which will vary the output frequency. A vacuum micro-electronic reactance tube can be used for the voltage controlled oscillator 118. Such an arrangement provides a precise correlation between the neutron flux monitored by the neutron detector 10 and the output frequency of the voltage controlled oscillator 118. Similar amplification and frequency conversion can be applied to the output of the thermocouple sensor to provide an output that is amplified by amplifier 120 whose output is communicated to a wireless transmitter 122 within the in-core instrument thimble assembly 16. The in-core instrument thimble assembly 16 can be made up of a single unit housing the thermocouple, neutron detector, power supply and transmission circuit or it can be made up of modular units, e.g., the self-contained power supply, thermocouple and neutron detector, and transmission circuit, respectively.

Figure 8:
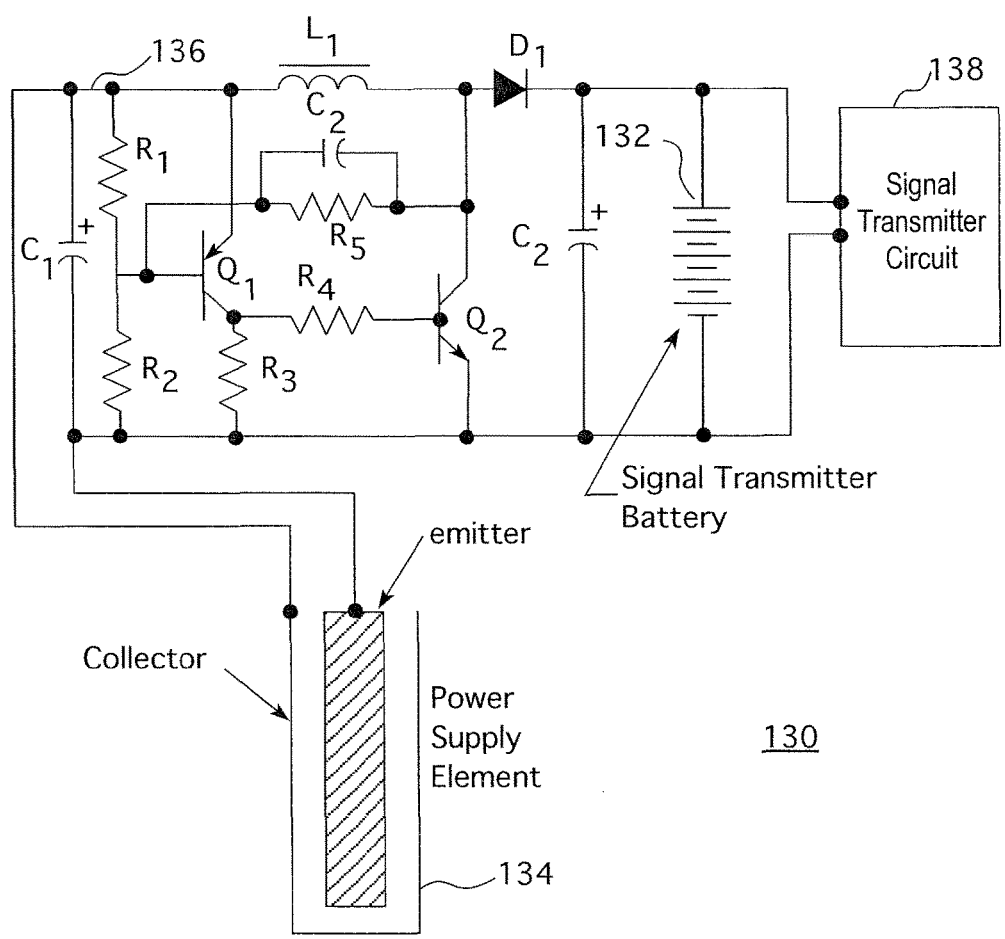
FIG. 8 is a schematic circuitry diagram of a power supply circuit which can be employed with the power supply element of this invention to energize the electrical circuitry illustrated in FIG. 7.
Figure 9:
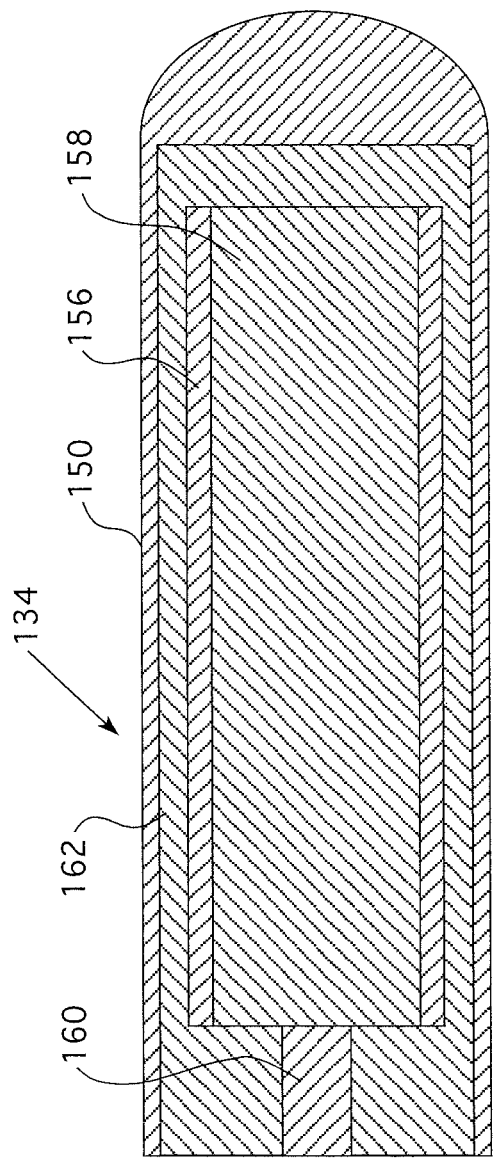
FIG. 9 is a cross sectional axial view of one embodiment of a power supply element of this invention.

The primary electrical power source for the signal transmitting electrical hardware is the rechargeable battery 132 shown as part of the exemplary power supply illustrated in FIG. 8. The charge on the battery 132 is maintained by the use of the electrical power produced by a dedicated power supply self-power element 134 that is contained within the power supply 130 integral to the in-core instrument thimble assembly. Thus, an integral wireless transmitter 138 is powered by a novel combined fission gamma-neutron transmutation product gamma current generator integral to the in-core instrument thimble assembly in accordance with this embodiment of the invention. The self-powered power supply element 134 is shown in more detail in FIGS. 9 and 10 and will be more fully described hereafter. Further, in accordance with this embodiment, the neutron and gamma radiation measurements are obtained from separate neutron and gamma sensitive self-powered detector elements, respectively, 142 and 140 (shown in FIG. 11), co-located in the in-core instrument thimble assembly that can be placed in the fuel assembly instrument thimble and will extend over the entire active core region 144. Because of the design of the transmitter power supply 134, the in-core instrument thimble assembly, constructed in accordance with this invention, will remain operable inside the fuel assembly throughout its entire life cycle—including residence in the spent fuel pool and any subsequent storage facility. The neutron, gamma, and thermocouple sensor signals in all of the instrumented fuel assemblies are measured and wirelessly transmitted to a central processing station where the signals may be used to produce an operating core power distribution or indications of a nearness to criticality and temperature distribution of the spent fuel assembly array in either the reactor 40 or after the fuel assemblies' operating life, in the spent fuel pool 148 figuratively shown in FIG. 12. In addition, the monitored signal can provide a calculated K-effective ($K_{eff}$) representative of the limiting $K_{eff}$ in the spent fuel pool. With suitable modifications to the current rod control cluster assembly hub design 102, this in-core instrument thimble assembly design will allow every fuel assembly in the core to be instrumented with these sensors, so the core power measurement uncertainty that limits the amount of reactor power that is allowed to be generated in the reactor core can be adjusted, to increase the permissible power output of the core without increasing the average core fuel U-235 enrichment. This information may also be used to allow the total amount and distribution of fission product decay heat, and the associated coolant pool temperature distribution, in the spent fuel pool to be tracked on a continuous basis without relying on sensors that could be rendered inoperable during a station blackout situation. Application of this invention will allow a utility to maximize the amount of fuel that can be safely stored in the spent fuel pool, and greatly improve the available knowledge of core and spent fuel pool conditions in the event of circumstances that causes a station blackout.

Figure 1:
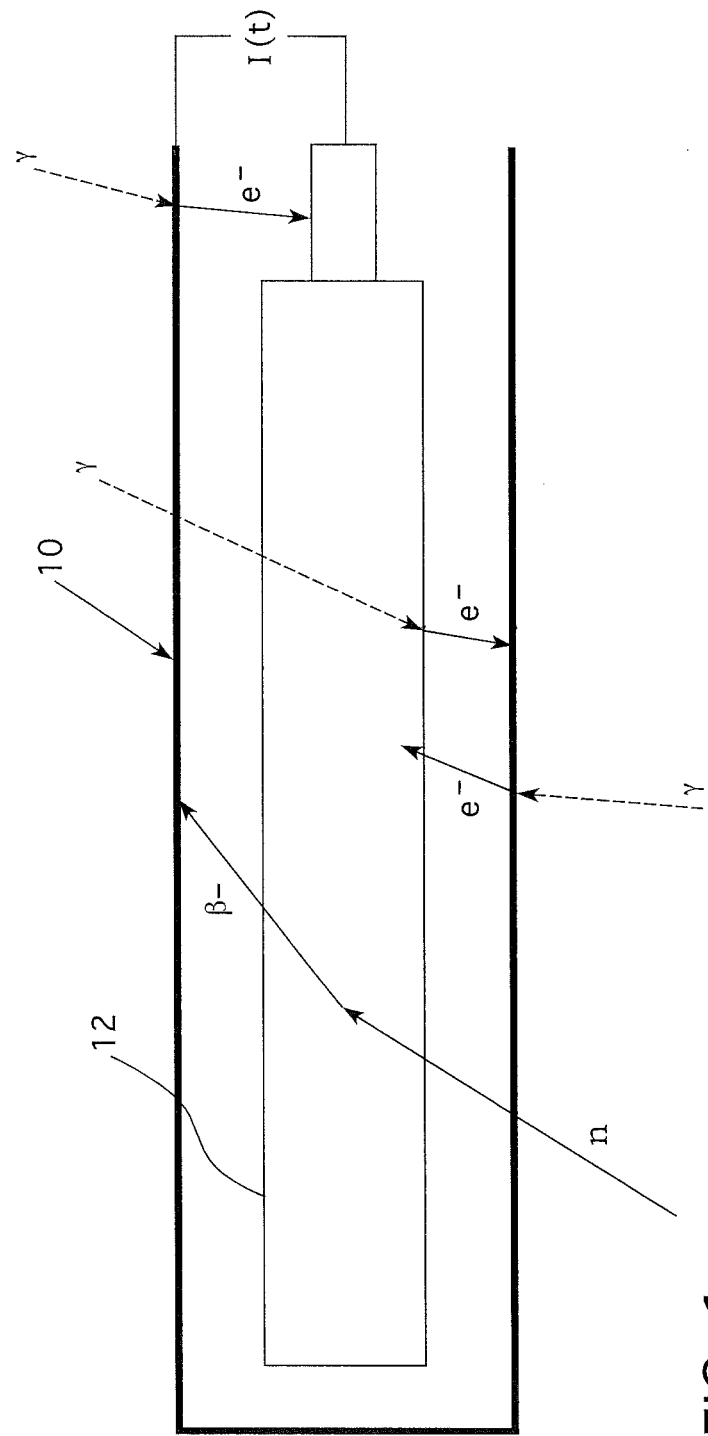
FIG. 1 is a schematic representation of a self-powered radiation detector.
Figures 2A, 2B, 2C:
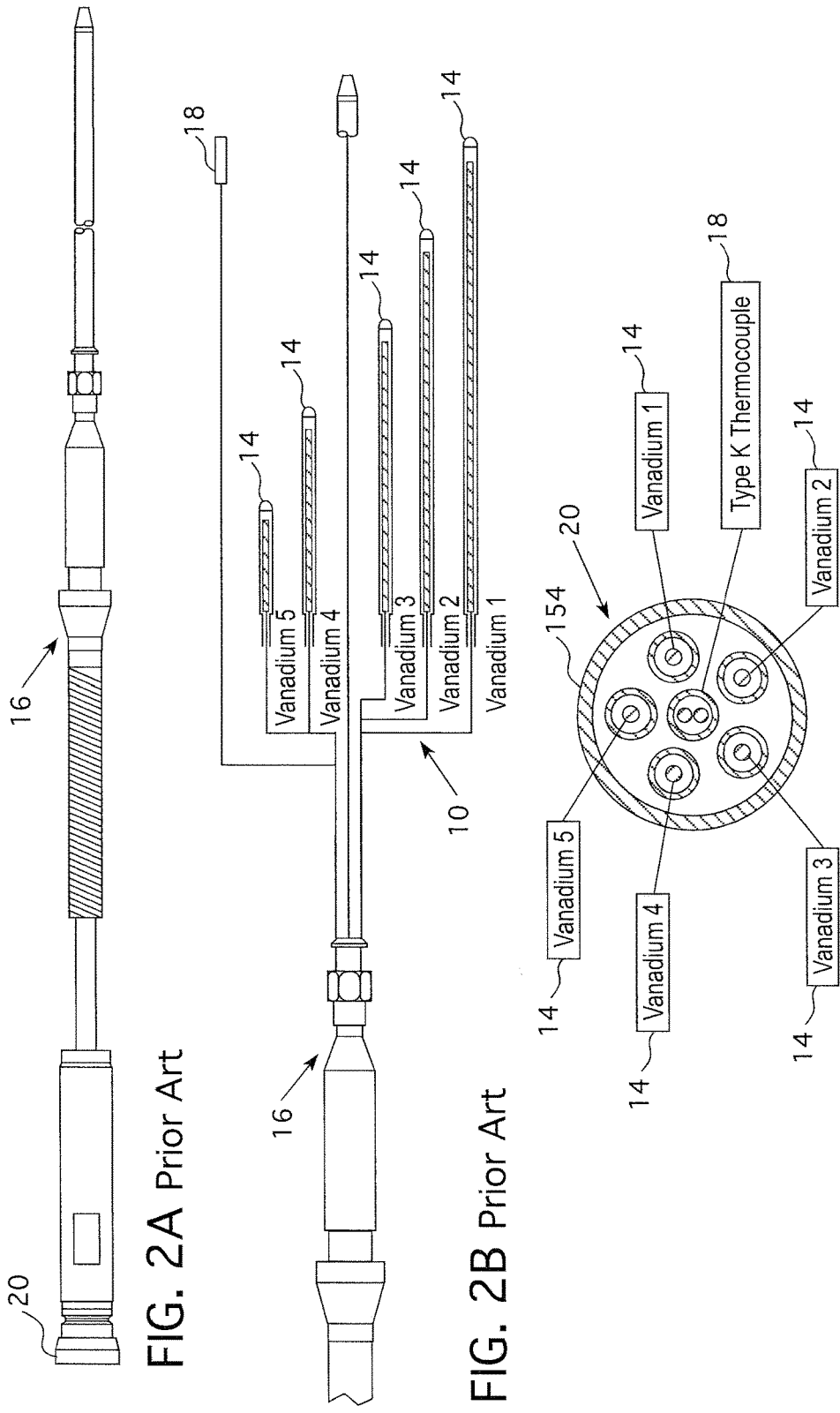
FIG. 2A is a plan view of an in-core instrument thimble.
FIG. 2B is a schematic view of the interior of the forward sheath of the in-core instrument thimble assembly of FIG. 2A.
FIG. 2C is a sectional view of the electrical connector at the rear end of the in-core instrument thimble assembly of FIG. 2A.
Figure 11:
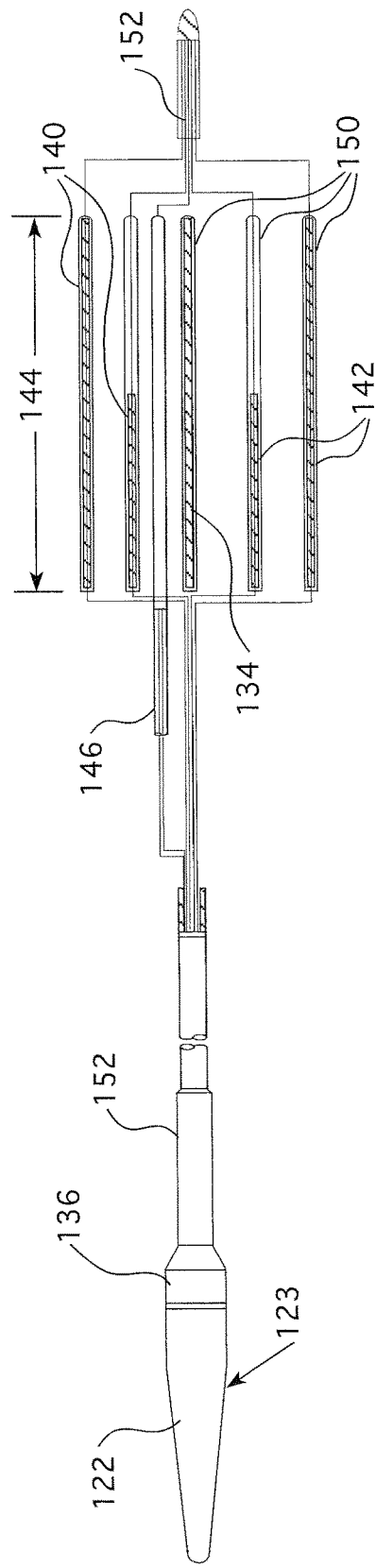
FIG. 11 is a schematic view of the interior of an in-core instrument thimble assembly incorporating one embodiment of this invention.

One preferred embodiment of the in-core instrument thimble assembly of this invention is shown in FIG. 11 and includes: i) the neutron and/or gamma sensitive self-powered detector elements 140, 142 positioned at specific positions within a fuel assembly; ii) a type-K core exit thermocouple 146 axially positioned at the top of the active fuel region 144 inside the fuel assembly, with both the core exit thermocouple 146 and the self-powered detector elements 140, 142 contained within individual metallic outer sheaths 150 with a common electrical ground 152 so that the elements all remain electrically isolated; iii) an electrical power supply element 134 that relies on electrical current generated primarily by fission gamma interaction to produce an electrical current while the in-core instrument thimble assembly is contained inside a fuel assembly in an operating reactor core and relies on supplemental radiation produced by neutron transmutation or fission products from material contained within the power supply element to generate electrical current at times following a short amount of time inside an operating reactor core or while the fuel assembly is stored within the spent fuel pit or a fuel assembly storage cask; iv) signal processing electronics 136, such as previously described to transmit the self-powered detector and core exit thermocouple signal information, positioned such that the hermetic and environmentally qualified electronics package is located in the fuel assembly top nozzle region 84; v) an antenna package configure to allow the signal processing electronics 122 to transmit a signal that can be received by a receiving antenna 124 located in the reactor upper head region 42 that will allow the signal to be channeled out of the reactor vessel so it can be rebroadcast by transmitter-receiver 138 to receivers 116 located outside of the reactor containment building; and vi) a metallic outer sheath 154 (such as the prior art sheath shown in FIG. 2C) that contains elements (i) through (v) of this embodiment that protects the elements from direct exposure to reactor coolant or other sources of moisture ingress and provides the in-core instrument thimble assembly with protection from mechanical damage and electrical isolation from external electromagnetic and/or radio frequency interference sources.

Figure 10:
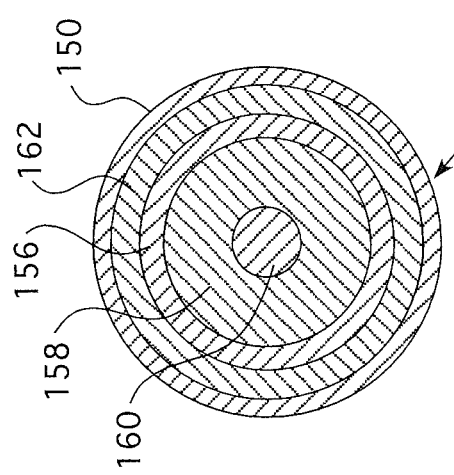
FIG. 10 is a cross sectional radial view of the embodiment shown in FIG. 9.

More particularly, FIG. 11 illustrates a schematic layout of one preferred embodiment of this in-core instrument thimble assembly configured tier use within a small modular reactor design offered by Westinghouse Electric Company LLC, Cranberry, Pa. FIG. 10 illustrates a schematic example of an embodiment of the power supply element 134 outlined on FIG. 11. In the power supply element shown in FIGS. 9 and 10, the primary source of electric current as a function of time, I(t) generated within the device are the Compton and photo-electrically scattered electrons produced in a platinum coating 156 on a hollow cobalt-59 wire 158 by the gamma radiation produced by fission and fission products inside an operating reactor core. After the in-core instrument thimble assembly has been inside an operating reactor core for some relatively short period of time during a typical reactor operating cycle, the gamma and beta radiation produced by the decay of cobalt-60 that is generated when cobalt-59 absorbs a neutron will begin to produce additional contributions to the output electric current which is conveyed to the battery 132 through the central electrical lead 160. Eventually, the amount of cobalt-60 produced from the cobalt-59 will be sufficient to provide the electrical current required to power the self-powered detector signal transmitter 138 even when the reactor is shut down or the fuel assembly containing the in-core instrument thimble assembly is discharged from the reactor core. This operating principle can be achieved with other power supply element materials and the concepts described herein are not meant to be limited to the use of cobalt-59. One key to the novelty of this in-core instrument thimble assembly design is the use of materials that are initially not radioactive that are able to produce electrical power when placed inside an operating reactor core and essentially breed material to enhance the power produced by the power supply element sufficient to allow the power supply element to provide sufficient power to the in-core instrument thimble assembly transmitter to allow it to function adequately when the fuel assembly is removed from the reactor core.

The size, thickness and mass of signal generating material and electrical insulation contained within the power supply element 134 can be optimized to produce a power output and output rate to match the power consumption requirements of the broadest rate and signal amplitude of the transmitter electronics. Because this in-core instrument thimble assembly design can reside inside a fuel assembly even following its placement inside the spent fuel pool, irradiated in-core instrument thimble assemblies that have a significant portion of their electrical current generated by the power supply elements resulting from the neutron activated component of the power supply element, may be transferred from one fuel assembly to another to ensure a specific minimum electrical power is available to support both usage inside fuel assemblies recently placed in the spent fuel pool that have relatively high levels of fission product gamma radiation sources and inside fuel assemblies that have resided in the spent fuel pool for long times that have allowed the fission product gamma radiation levels to decrease by many orders of magnitude.

It should also be noted that the attachment of the signal lead 160 to the cobalt-59 material may be accomplished by coating the signal lead wire 160 with cobalt-59 and then platinum 156. This approach will result in a more robust and durable power supply element than could be easily achieved by braising or crimping the signal lead to a cobalt-59 wire. Insulation, such as alumina insulation 162 is interposed between the outer sheath 150 and the platinum coating 156 and around the interface of the entire assembly with the outer sheath 150. This type of device could be used in all types of reactors and provide an added measure of efficiency for operating the reactors as well as safety.

Figure 3:
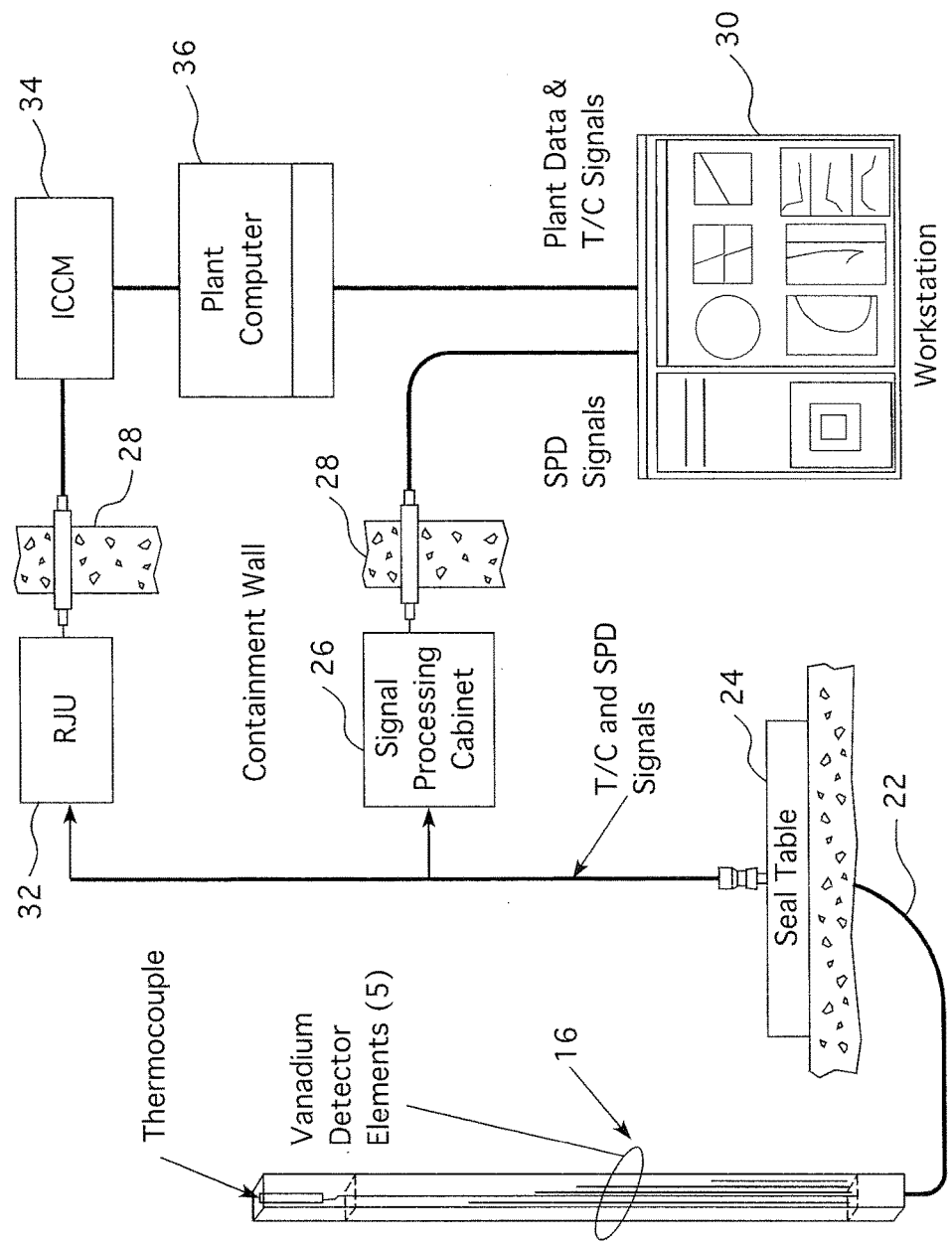
FIG. 3 is a schematic layout of an in-core monitoring system.
Figure 12:
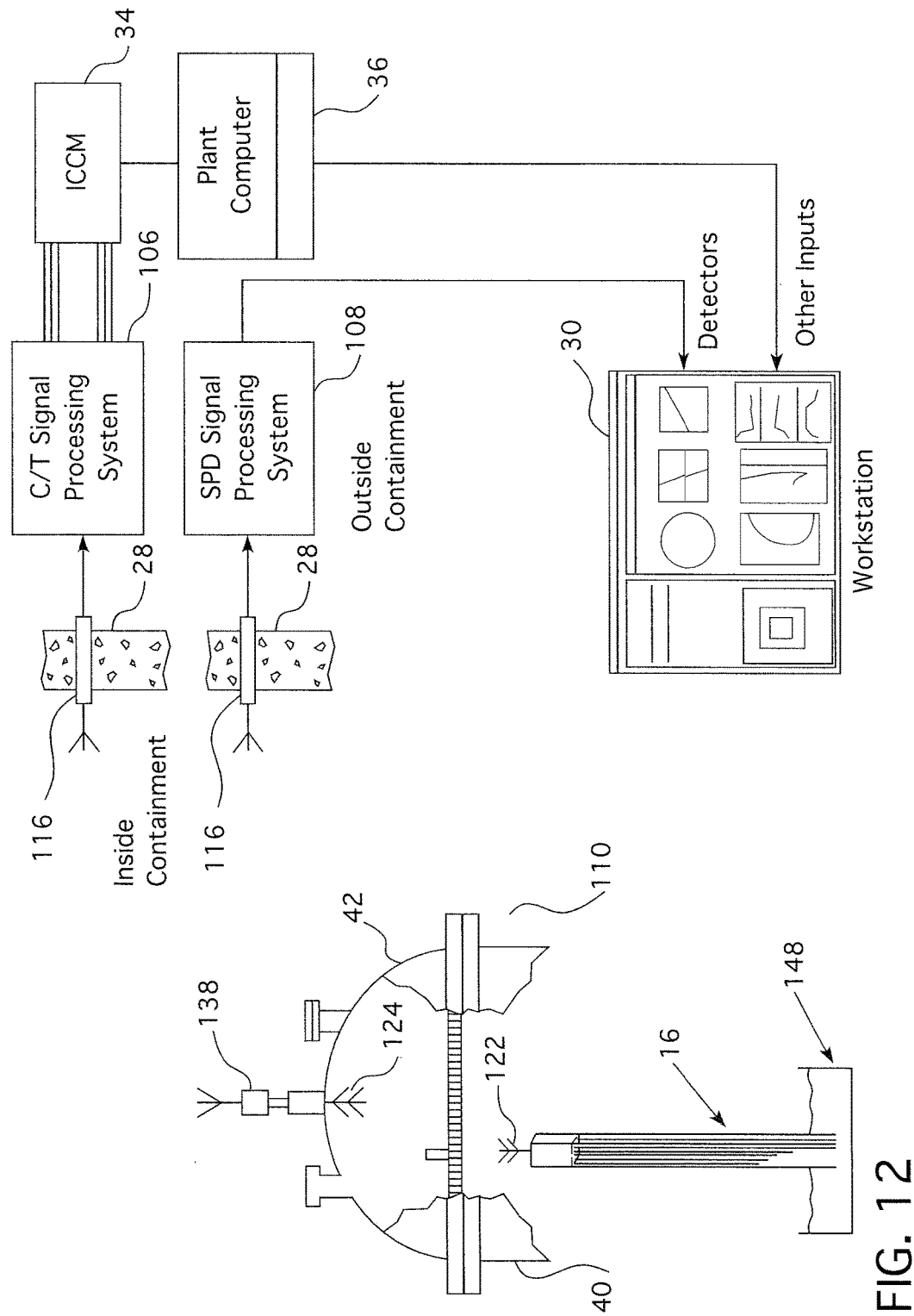
FIG. 12 is a schematic layout of a self-powered wireless in-core instrumentation core power distribution measurement system in accordance with this invention.

FIG. 12 is a schematic layout of a self-powered wireless in-core detector instrumentation core power distribution measurement system constructed in accordance with the one embodiment of this invention just described. The schematic layout illustrated in FIG. 12 is identical to the schematic layout illustrated in FIG. 3 for a conventional in-core monitoring system, except that the in-core instrument thimble assembly has been rotated 180° so that the electrical connectors for the detector element are closer to a receiver of the wireless transmitter signal and the cabling has been replaced by the wireless transmitters and receivers 122, 124, 138 and 116; and the in-core containment electronics 26 and 32 have been respectively replaced by the self-powered detector signal processing system 108 and the core exit thermocouple signal processing system 106, located outside the containment 28. In all other respects, the systems are the same.

As can also be appreciated from FIG. 12, the signal from the in-core instrument thimble assembly 16, wireless transmitter 122 is received by an antenna 124 on the underside of the reactor vessel head 42 which communicates with a combination wireless receiver and retransmitter 138 on the reactor head 42. In that way, the reactor head 42 can be removed and the fuel assemblies accessed without the in-core instrumentation being an obstacle. Placement of the transmitting antenna on the reactor vessel will depend on the reactor design but the intent is to transmit from a close proximity to the reactor vessel at a location that will not be an impediment to access in the fuel assembly. The neutron signal is then retransmitted by the retransmission circuit 138 to a receiver 116 proximate the containment outer wall. The combination receiver and retransmitter 138 should similarly be constructed from vacuum micro-electronic devices because of their close proximity to the reactor vessel; however, the receivers 116 and the processing circuitry 106 and 108 can be constructed from conventional solid state components and may be located within the containment remote from the reactor vessel or outside the containment. Additionally, the fuel assembly 16 is figuratively shown in a spent fuel pool 148 to illustrate that the fuel assembly can be continuously monitored after it is removed from the reactor to a spent fuel storage facility.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A power supply for a nuclear reactor in-core electronics assembly, the power supply comprising:
   a self powered power supply element comprising a material that prior to being irradiated does not produce a substantially measurable current capable of powering the in-core electronics assembly and upon being irradiated by an external source of radiation for a selected period of time produces the substantially measurable current even after being removed from exposure to the external source of radiation;
   a power supply housing hermetically sealing the power supply element from a coolant fluid within a core of a nuclear reactor; and
   an electrically conductive connector structured to connect to the in-core electronics assembly to transport the substantially measurable current to the in-core electronics assembly wherein the substantially measurable current is sufficient to power the in-core electronics assembly and communicate an output of the in-core electronics assembly to a location outside of the nuclear reactor without an auxiliary power input from outside of the core.

2. The power supply of claim 1 wherein the self powered power supply element after being removed from exposure to the external source for the selected period of time, produces the substantially measurable current from exposure to radiation produced by neutron transmutation or fission products from the material contained within the power supply element.

3. The power supply of claim 1 wherein the self powered power supply element produces the substantially measurable current after being irradiated within a reactor core.

4. The power supply of claim 1 wherein the self powered power supply element comprises the material that produces the substantially measurable current after being irradiated primarily by gamma radiation produced by fission interactions within a core of a nuclear reactor.

5. The power supply of claim 1 wherein the self powered power supply element comprises an electrical lead substantially, circumferentially surrounded by a Co-59 sleeve that is substantially, circumferentially enclosed within a platinum sheath.

6. The power supply of claim 5 wherein the platinum sheath is circumferentially enclosed within a steel outer sheath with electrical insulation interposed therebetween.

7. The power supply of claim 6 wherein the insulation is Alumina.

8. The power supply of claim 5 wherein the electrical lead is coated with Co-59, which in-turn is coated with platinum.

9. A nuclear fuel assembly having the in-core electronics assembly activated by the power supply element of claim 1, within an instrument thimble within the nuclear fuel assembly, the in-core electronics assembly comprising:
   separate neutron and gamma sensitive self-powered detector elements co-located in the in-core electronics assembly; and
   a thermocouple sensor located within the in-core electronics assembly within an upper portion of the instrument thimble substantially at a top nozzle of the nuclear fuel assembly;
   wherein the separate neutron and gamma sensitive elements and the thermocouple are configured to provide self powered wireless signals that are wirelessly transmitted, powered by the power supply element, to a processing station outside the core and from which a core power distribution, nearness to criticality, temperature distribution or $K_{eff}$ of the fuel assembly are capable of being determined.

10. The nuclear fuel assembly of claim 9 wherein the in-core electronics assembly is configured to provide information from which the total amount and distribution of fission product decay heat within the fuel assembly is able to be determined from the in-core electronics assembly when the fuel assembly is stored in a spent fuel storage receptacle.

11. The nuclear fuel assembly of claim 9 wherein the in-core electronics assembly is configured to provide information from which an associated coolant pool temperature distribution is able to be determined and tracked on a continuous, self powered, wireless basis when the fuel assembly is placed in a spent fuel pool.

12. The nuclear fuel assembly of claim 9 wherein the thermal couple sensor and the separate neutron and gamma sensitive detector elements are housed respectively within separate housings with a common electrical ground, configured so that the sensor and the elements are electrically isolated.

* * * * *